United States Patent
Yoshitomi

(10) Patent No.: US 11,658,325 B2
(45) Date of Patent: May 23, 2023

(54) FUEL CELL VEHICLE

(71) Applicant: HONDA MOTOR CO., LTD., Tokyo (JP)

(72) Inventor: Ryoichi Yoshitomi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 775 days.

(21) Appl. No.: 16/680,549

(22) Filed: Nov. 12, 2019

(65) Prior Publication Data

US 2020/0161691 A1    May 21, 2020

(30) Foreign Application Priority Data

Nov. 15, 2018  (JP) .............................. JP2018-214681

(51) Int. Cl.
| | |
|---|---|
| *H01M 8/2475* | (2016.01) |
| *H01M 8/248* | (2016.01) |
| *H01M 8/2457* | (2016.01) |
| *H01M 8/0258* | (2016.01) |
| *H01M 8/04955* | (2016.01) |

(52) U.S. Cl.
CPC ....... *H01M 8/2475* (2013.01); *H01M 8/0258* (2013.01); *H01M 8/04955* (2013.01); *H01M 8/248* (2013.01); *H01M 8/2457* (2016.02)

(58) Field of Classification Search
CPC ............ H01M 8/2475; H01M 8/0258; H01M 8/04955; H01M 8/2457; H01M 8/248; B60L 3/0007

See application file for complete search history.

(56) References Cited

U.S. PATENT DOCUMENTS

| | | | |
|---|---|---|---|
| 9,834,079 B2 | 12/2017 | Nishikawa et al. | |
| 2010/0167151 A1* | 7/2010 | Nagasawa | H01M 8/04044 429/437 |
| 2012/0015257 A1* | 1/2012 | Arisawa | B60L 50/72 429/400 |
| 2013/0008733 A1 | 1/2013 | Gleyzes et al. | |
| 2017/0113531 A1 | 4/2017 | Imamura et al. | |

FOREIGN PATENT DOCUMENTS

| | | |
|---|---|---|
| CN | 207624817 | 7/2018 |
| JP | 2010-012963 | 1/2010 |
| JP | 2013-012478 | 1/2013 |
| JP | 2015-157608 | 9/2015 |
| JP | 2017-77821 | 4/2017 |
| JP | 2017-144859 | 8/2017 |

OTHER PUBLICATIONS

Yagawa and Kawasaki, JP 2008-931201 (Published as JP 2009-245862 A), Oct. 22, 2009, Global Dossier (Year: 2009).*
Japanese Office Action for Japanese Patent Application No. 2018-214681 dated Nov. 9, 2021.

* cited by examiner

*Primary Examiner* — Cynthia H Kelly
*Assistant Examiner* — Jenna Shulman
(74) *Attorney, Agent, or Firm* — Amin, Turocy & Watson, LLP

(57) ABSTRACT

A fuel cell vehicle includes a fuel cell stack, a stack case containing the fuel cell stack, and an interruption control unit for electrically interrupting an output line of the fuel cell stack at the time of vehicle collision. The interruption control unit is arranged on an upper surface of the stack case, and a front end of the interruption control unit is positioned on the vehicle rear side as compared with a front end of the stack case.

10 Claims, 3 Drawing Sheets

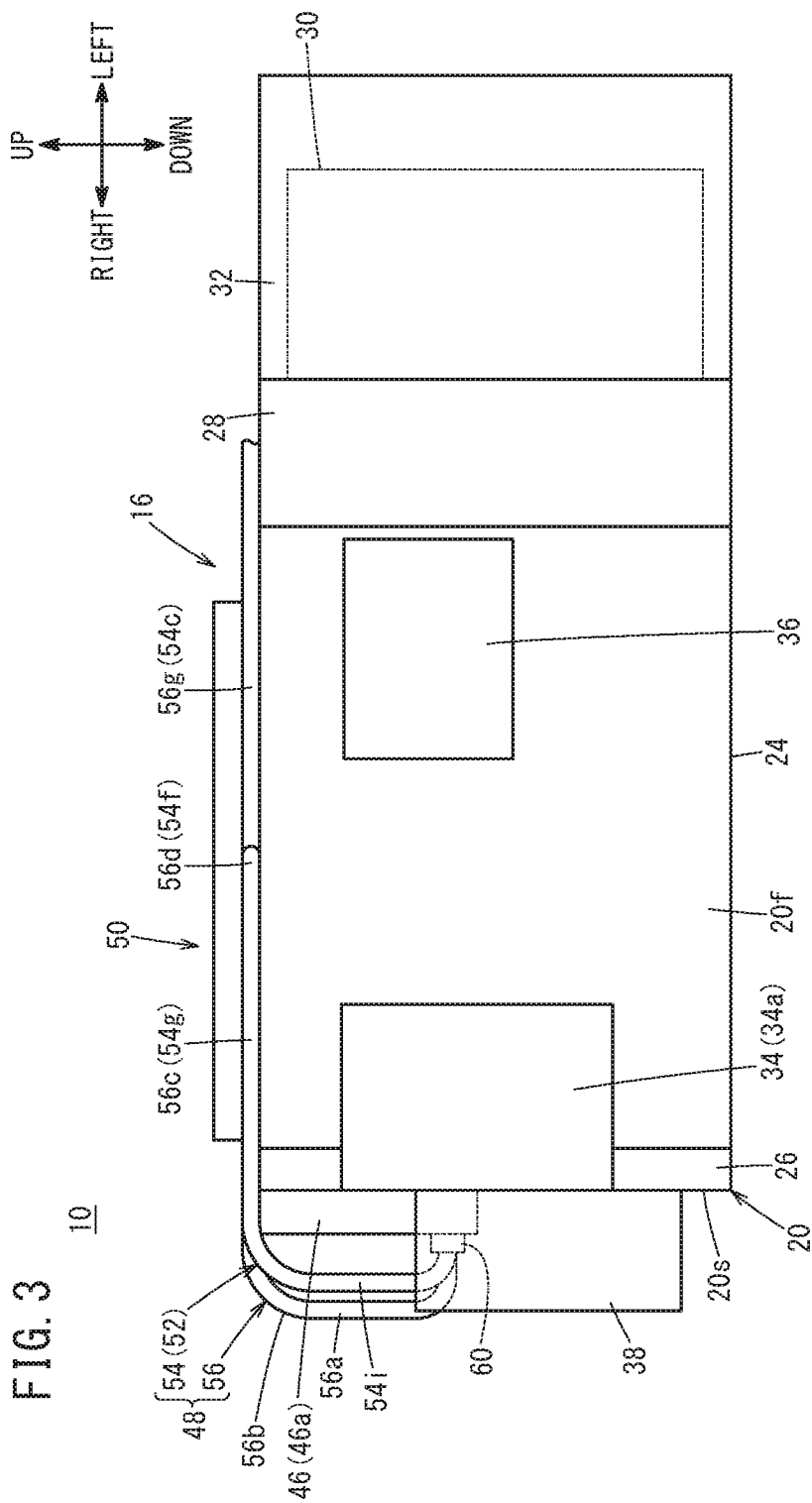

FUEL CELL VEHICLE

CROSS-REFERENCE TO RELATED APPLICATION

This application is based upon and claims the benefit of priority from Japanese Patent Application No. 2018-214681 filed on Nov. 15, 2018, the contents of which are incorporated herein by reference.

BACKGROUND OF THE INVENTION

Field of the Invention

The present invention relates to a fuel cell vehicle including a fuel cell stack, a stack case containing the fuel cell stack, and an interruption control unit for electrically interrupting an output line of the fuel cell at the time of vehicle collision.

Description of the Related Art

For example, Japanese Laid-Open Patent Publication No. 2017-077821 discloses structure where an interruption control unit is arranged on a front surface of a stack case containing the fuel cell stack (surface oriented toward the vehicle front side).

SUMMARY OF THE INVENTION

In this regard, in a fuel cell vehicle, at the time of front collision (minor collision) of the vehicle, it is required to provide protection against damage of various electric members such as an interruption control unit, an FCECU (fuel cell (electronic) control unit), a VCU (voltage control unit), and cables.

In the conventional technique, since the interruption control unit is arranged on the front surface of the stack case, it is required to arrange protection members for protecting interruption control units at the time of front collision of the vehicle, on the front side of the interruption control unit. As a result, the structure may be complicated, and may push up the cost undesirably.

The present invention has been made taking such problems of this type into account, and an object of the present invention is to provide a fuel cell vehicle having simple and economical structure in which it is possible to protect electric members at the time of front collision of the vehicle.

According to one aspect of the present invention, a fuel cell vehicle is provided. The fuel cell vehicle includes a fuel cell stack, a stack case containing the fuel cell stack, and an interruption control unit configured to electrically interrupt an output line of the fuel cell stack at the time of vehicle collision, wherein the interruption control unit is arranged on an upper surface of the stack case, and a front end of the interruption control unit is positioned on a vehicle rear side as compared with a front end of the stack case.

In the present invention, since the front end of the interruption control unit is positioned on the vehicle rear side of the front end of the stack case, the stack case can receive collision at the time of front collision of the vehicle before the collision load is applied to the interruption control unit. Accordingly, with the simple and economical structure, it is possible to protect the interruption control unit (electric member) at the time of front collision of the vehicle.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 3 is a front view showing the fuel cell system of FIG. 1, viewed from the vehicle front side.

DESCRIPTION OF THE PREFERRED EMBODIMENTS

Preferred embodiments of a fuel cell vehicle according to the present invention will be described with reference to the accompanying drawings.

Figure 1:
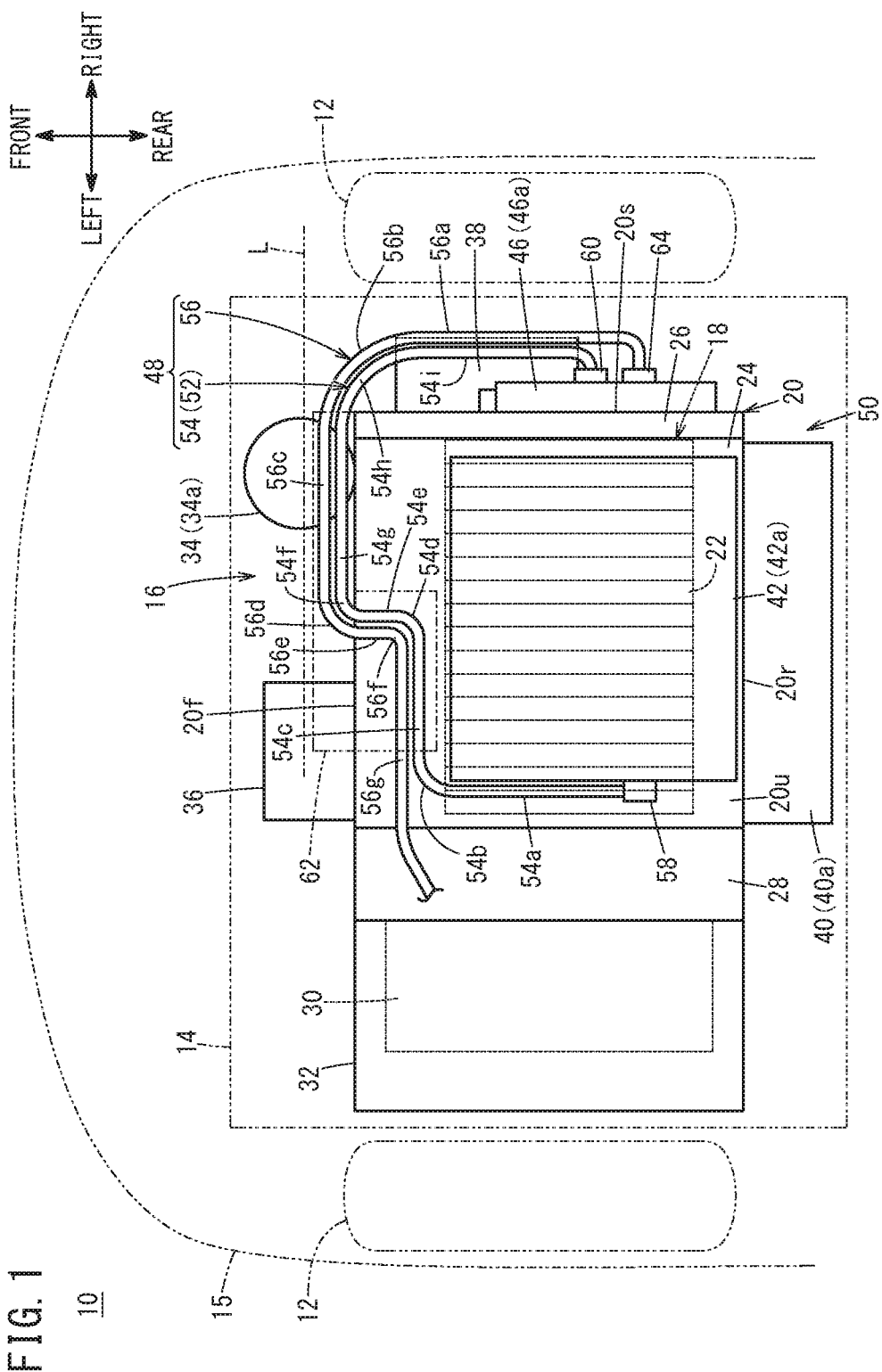
FIG. 1 is a plan view with partial omission, showing a fuel cell vehicle according to an embodiment of the present invention.

As shown in FIG. 1, a fuel cell vehicle 10 according to an embodiment of the present invention is a fuel cell electric vehicle, and includes a fuel cell system 16 provided in a motor room 14 adjacent to front wheels 12. The fuel cell system 16 includes a fuel cell stack 18, and a stack case 20 containing the fuel cell stack 18.

The fuel cell stack 18 includes a plurality of power generation cells 22 that are stacked together. The plurality of power generation cells 22 are stacked in a vehicle width direction. The power generation cell 22 performs power generation by electrochemical reactions of a fuel gas (e.g., hydrogen gas) and an oxygen-containing gas (e.g., air). Coolant water flows inside the fuel cell stack 18.

The stack case 20 is a case for protecting the fuel cell stack 18 from external loads. The stack case 20 is made of metal material, hard resin material, etc. Examples of metal material include aluminum alloy, iron alloy, etc.

The stack case 20 includes a case body 24, a right end cover 26, and a left end cover 28. The case body 24 covers the fuel cell stack 18 from a direction which is perpendicular to the vehicle width direction (vehicle front/rear direction and vertical direction). That is, the case body 24 has a quadrangular tube shape. The right end cover 26 is coupled to the right end of the case body 24. The left end cover 28 is coupled to the left end of the case body 24.

An auxiliary device case 32 containing fuel cell auxiliary devices 30 is coupled to the left end cover 28. The auxiliary device case 32 is a protection case for protecting the fuel cell auxiliary devices 30. The auxiliary device case 32 is provided adjacent to the left end cover 28 in the vehicle left direction. Hydrogen system auxiliary devices (hydrogen gas supply devices) are stored as the fuel cell auxiliary devices 30, in the auxiliary device case 32. Though not shown in detail, the hydrogen system auxiliary devices include an injector, an ejector, a hydrogen pump, and valves.

Figure 2:
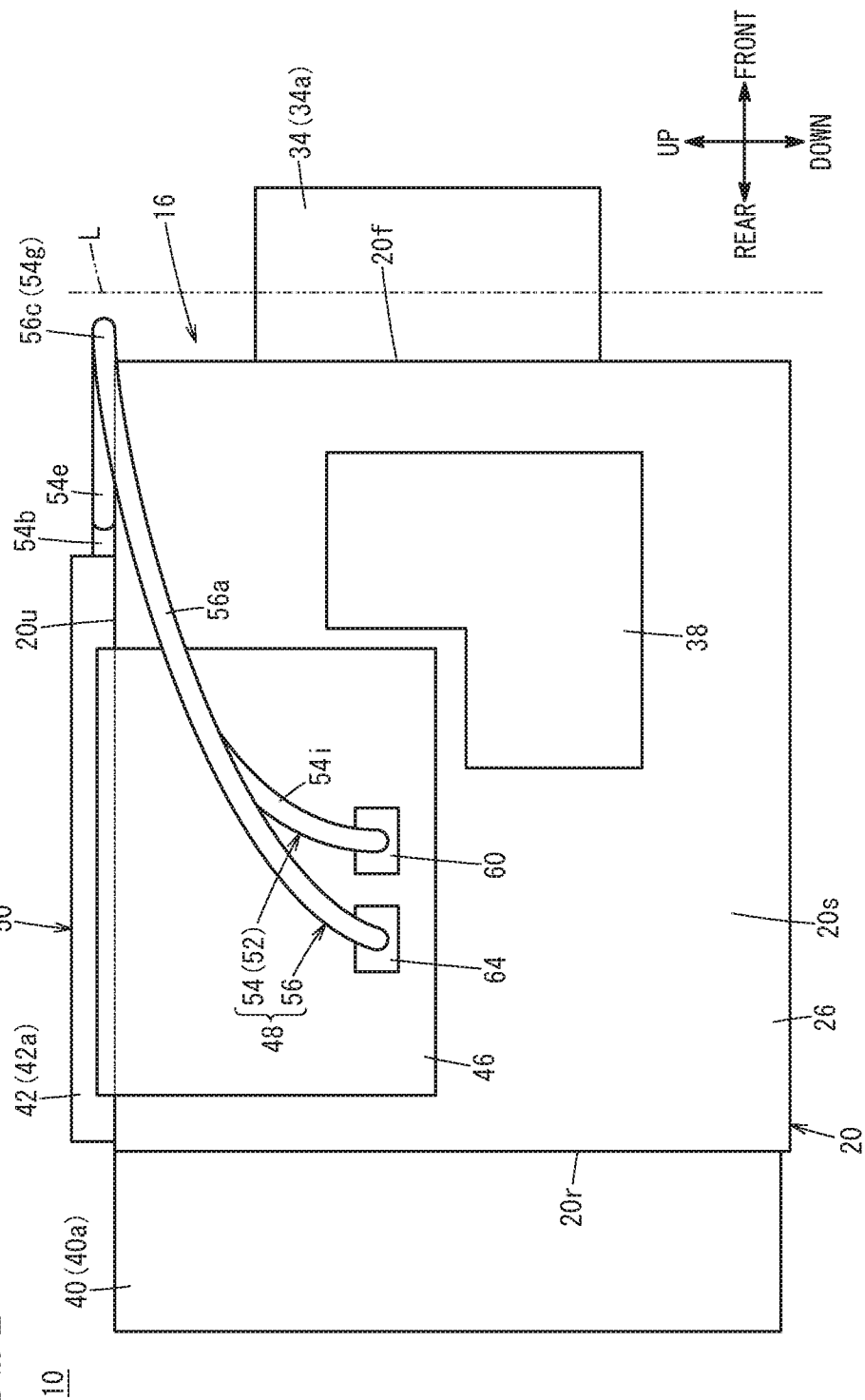
FIG. 2 is a right side view showing a fuel cell system of FIG. 1.

As shown in FIGS. 1 to 3, an ion exchanger 34 and a temperature regulator valve 36 are juxtaposed in the vehicle width direction, on a front surface 20$f$ of the stack case 20 (surface oriented to the vehicle front side). The ion exchanger 34 removes impurities in the coolant water for the fuel cell stack 18. The ion exchanger 34 is fixed to the vehicle right side, on the front surface 20$f$ of the stack case 20, by a tightening member such as bolts (not shown). The ion exchanger 34 includes a cylindrical ion exchanger case 34$a$. For example, the ion exchanger case 34$a$ is made of hard resin material. The ion exchanger 34 is collapsible toward the vehicle rear side at the time of front collision of the vehicle.

The temperature regulator valve 36 is a thermostat for regulating the temperature of the coolant water for the fuel cell stack 18. Specifically, the temperature regulator valve 36 performs switching to a flow channel where the coolant water flows into a radiator (not shown) in the case of cooling the fuel cell stack 18, or switching to a flow channel where the coolant water does not flow into the radiator in the case of warming up the fuel cell stack 18. The temperature regulator valve 36 is fixed to the vehicle left side of the front surface 20*f* of the stack case 20 by a tightening member such as bolts (not shown). The front end of the temperature regulator valve 36 is positioned on the vehicle rear side (positioned rearward) as compared with the front end of the ion exchanger 34.

A mount 38 is arranged on a right side surface 20*s* of the stack case 20 (outer surface of the right end cover 26), for fixing the stack case 20 to a vehicle body 15. The front end of the mount 38 is positioned on the vehicle rear side as compared with the front end of the stack case 20. The mount 38 is fixed to a lower front position of the right side surface 20*s* of the stack case 20 using a tightening member such as bolts (not shown) (see FIG. 2).

The fuel cell system 16 further includes electric members 50 such as a voltage control unit (VCU) 40, an interruption control unit 42, a fuel cell (electronic) control unit (FCECU) 46, and a cable 48.

In FIGS. 1 and 2, the voltage control unit 40 controls the output voltage of the fuel cell stack 18. Specifically, the voltage control unit 40 is a step-up (voltage elevation) converter for boosting the output voltage of the fuel cell stack 18. The voltage control unit 40 is arranged on the vehicle rear side of the stack case 20. Stated otherwise, the voltage control unit 40 is arranged on a rear surface 20*r* (surface oriented toward the vehicle rear side) of the stack case 20. The voltage control unit 40 includes a voltage control case 40*a* which is a rectangular parallelepiped (box shaped) case. The voltage control case 40*a* is fixed to the rear surface 20*r* of the stack case 20 using a tightening member such as bolts (not shown).

As shown in FIGS. 1 to 3, the interruption control unit 42 is a stack board sensor which electrically interrupts an output line 52 (high voltage output line) of the fuel cell stack 18 at the time of vehicle collision. In the steady state where collision of the fuel cell vehicle 10 does not occur, the interruption control unit 42 is electrically connected to the voltage control unit 40. That is, electrical current outputted from the fuel cell stack 18, and boosted by the voltage control unit 40 is guided to the interruption control unit 42.

The interruption control unit 42 is arranged on an upper surface 20*u* of the stack case 20. The front end of the interruption control unit 42 is positioned on the vehicle rear side as compared with the front end of the stack case 20 (as shown in FIGS. 1 and 2). The rear end of the interruption control unit 42 and the rear end of the upper surface 20*u* of the stack case 20 are provided at substantially the same position. It should be noted that the rear end of the interruption control unit 42 may be positioned on the vehicle front side as compared with the rear end of the upper surface 20*u* of the stack case 20. The interruption control unit 42 includes an interruption control case 42*a* which is a rectangular parallelepiped (box shaped) case. The interruption control case 42*a* is smaller than the upper surface 20*u* of the stack case 20 in a plan view viewed from above (see FIG. 1).

The fuel cell (electronic) control unit 46 (FCECU) controls the fuel cell stack 18. The fuel cell control unit 46 is arranged on the right side surface 20*s* of the stack case 20 (outer surface of the right end cover 26). That is, the mount 38 and the fuel cell control unit 46 are arranged on the same side surface (right side surface 20*s*) of the stack case 20, respectively.

The fuel cell control unit 46 is arranged on the vehicle rear side of the mount 38 in a manner that the fuel cell control unit 46 is overlapped with the mount 38 in a front view viewed from the vehicle front side (see FIG. 3). In FIG. 2, the fuel cell control unit 46 is positioned at an upper part of the right side surface 20*s* of the stack case 20 in a manner that the upper end of the fuel cell control unit 46 protrudes above the upper surface 20*u* of the stack case 20. The front end of the fuel cell control unit 46 is positioned on the vehicle rear side as compared with the front end of the mount 38. In FIG. 1, the thickness of the fuel cell control unit 46 (dimension in the vehicle width direction) is smaller than the dimension of the mount 38 in the vehicle width direction. That is, the end of the vehicle right side of the fuel cell control unit 46 is positioned on the vehicle left side (inner side of the vehicle width direction) as compared with the end of the vehicle right side of the mount 38.

The fuel cell control unit 46 includes a fuel cell control case 46*a* which is a rectangular parallelepiped (box shaped) case. The fuel cell control case 46*a* is fixed to the right side surface 20*s* of the stack case 20 by a tightening member such as bolts (not shown).

As shown in FIG. 1, the cable 48 is electrically connected to the fuel cell control unit 46. Specifically, the cable 48 includes a first cable 54 electrically connecting the interruption control unit 42 and the fuel cell control unit 46 together, and a second cable 56 for connecting the fuel cell control unit 46 and electrical equipment (not shown) together.

The first cable 54 is part of the output line 52 of the fuel cell stack 18. One end of the first cable 54 is connected to a connector 58 provided on the left side surface of the interruption control case 42*a*. The other end of the first cable 54 is electrically connected to a first connector 60 provided on a surface of the fuel cell control case 46*a* oriented opposite to the stack case 20 (vehicle right side).

The first cable 54 extends from the connector 58 of the interruption control unit 42 to the first connector 60 of the fuel cell control unit 46, through a first extension portion 54*a*, a first bent portion 54*b*, a second extension portion 54*c*, a second bent portion 54*d*, a third extension portion 54*e*, a third bent portion 54*f*, a fourth extension portion 54*g*, a fourth bent portion 54*h*, and a fifth extension portion 54*i*.

The first extension portion 54*a* extends from the connector 58 of the interruption control unit 42 toward the vehicle front side. The first bent portion 54*b* is positioned between the front end of the interruption control unit 42 and the front end of the stack case 20. The second extension portion 54*c* extends from the first bent portion 54*b* to the second bent portion 54*d* toward the vehicle right side. The second bent portion 54*d* is positioned at substantially the center of the stack case 20 in the vehicle width direction.

The third extension portion 54*e* extends from the second bent portion 54*d* to the third bent portion 54*f* toward the vehicle front side. The third bent portion 54*f* is positioned on the vehicle front side as compared with the front end of the stack case 20. The third bent portion 54*f* is positioned between the ion exchanger 34 and the temperature regulator valve 36 in the vehicle width direction.

The fourth extension portion 54*g* extends in the vehicle width direction from the third bent portion 54*f* to the fourth bent portion 54h toward the vehicle right side. The fourth extension portion 54g is positioned on the vehicle front side as compared with the front end of the stack case 20. The fourth extension portion 54g is positioned on the vehicle rear side as compared with the front end of the ion exchanger 34. Stated otherwise, the fourth extension portion 54g is positioned on the vehicle rear side as compared with the center of the ion exchanger 34 in the vehicle front/rear direction. The fourth extension portion 54g is positioned above the ion exchanger 34 (see FIG. 2). The fourth bent portion 54h is positioned on the vehicle right side of the stack case 20. The fifth extension portion 54i extends from the fourth bent portion 54h to the first connector 60 of the fuel cell control unit 46 toward the vehicle rear side.

Part of the first cable 54 (the second extension portion 54c, the second bent portion 54d, the third extension portion 54e, the third bent portion 54f, and the fourth extension portion 54g) is covered with an insulating cover 62, and in this state, fixed to the stack case 20.

One end of the second cable 56 is electrically connected to a second connector 64 provided on a surface of the fuel cell control case 46a oriented opposite to the stack case 20 (vehicle right side). The other end of the second cable 56 is electrically connected to electrical equipment (not shown).

The second cable 56 extends from the second connector 64 of the fuel cell control unit 46 to electrical equipment (not shown) through a first extension portion 56a, a first bent portion 56b, a second extension portion 56c, a second bent portion 56d, a third extension portion 56e, a third bent portion 56f, and a fourth extension portion 56g.

The first extension portion 56a is arranged on the vehicle right side of the fifth extension portion 54i of the first cable 54. The first bent portion 56b is arranged along the fourth bent portion 54h of the first cable 54. The second extension portion 56c is arranged along the fourth extension portion 54g of the first cable 54, on the vehicle front side. That is, the second extension portion 56c is arranged on the vehicle rear side as compared with the front end of the ion exchanger 34. Stated otherwise, the second extension portion 56c is positioned on the vehicle rear side as compared with the center of the ion exchanger 34 in the vehicle front/rear direction. The second extension portion 56c is positioned above the ion exchanger 34 (see FIG. 2).

The second bent portion 56d is arranged along the third bent portion 54f of the first cable 54. The third extension portion 56e is arranged along the vehicle left side of the third extension portion 54e of the first cable 54. The third bent portion 56f is arranged along the second bent portion 54d of the first cable 54. The fourth extension portion 56g extends from the third bent portion 56f toward the vehicle left side of the stack case 20.

Part of the second cable 56 (the second extension portion 56c, the second bent portion 56d, the third extension portion 56e, the third bent portion 56f, and part of the fourth extension portion 56g) is covered with the insulating cover 62, and in this state, fixed to the stack case 20.

In FIGS. 1 and 2, portion of the cable 48 positioned at the forefront position of the vehicle (cable forefront portion) is positioned on the vehicle rear side as compared with the front end of the ion exchanger 34. In the embodiment of the present invention, the cable forefront portion is the second extension portion 56c of the second cable 56.

The cable forefront portion is positioned above the ion exchanger 34. The cable forefront portion is positioned on the vehicle rear side of the center of the ion exchanger 34 in the vehicle front/rear direction. The cable forefront portion is positioned on the vehicle rear side as compared with a collapse limitation line L of the ion exchanger 34. The collapse limitation line L herein means a line indicating the position of the front end of the ion exchanger 34 when the ion exchanger 34 is collapsed to the limit toward the vehicle rear side.

The fuel cell vehicle 10 offers the following advantages.

The front end of the interruption control unit 42 is positioned on the vehicle rear side as compared with the front end of the stack case 20. Therefore, the stack case 20 can receive the collision load at the time of front collision of the vehicle before the collision load is applied to the interruption control unit 42. Accordingly, with simple and economical structure, it is possible to protect the interruption control unit 42 (electric member 50) at the time of front collision of the vehicle.

The fuel cell vehicle 10 further includes the voltage control unit 40 electrically connected to the interruption control unit 42, and configured to control the output voltage of the fuel cell stack 18. The voltage control unit 40 is arranged on the vehicle rear side of the stack case 20.

In the structure, the stack case 20 can receive the collision load at the time of front collision of the vehicle before the collision load is applied to the voltage control unit 40. Accordingly, with the simple and economical structure, it is possible to protect the voltage control unit 40 (electric member 50) at the time of front collision of the vehicle.

The fuel cell vehicle 10 includes the mount 38 configured to fix the stack case 20, and the fuel cell control unit 46 configured to control the fuel cell stack 18. The fuel cell control unit 46 is arranged on the vehicle rear side of the mount 38 in a manner that the fuel cell control unit 46 is overlapped with the mount 38 in a front view viewed from the vehicle front side.

In the structure, the mount 38 can receive the collision load at the time of front collision of the vehicle before the collision load is applied to the fuel cell control unit 46. Accordingly, with the simple and economical structure, it is possible to protect the fuel cell control unit 46 (electric member 50) at the time of front collision of the vehicle.

The mount 38 and the fuel cell control unit 46 are arranged on the same side surface of the stack case 20 in the vehicle width direction, respectively. The front end of the mount 38 is positioned on the vehicle rear side as compared with the front end of the stack case 20.

In the structure, the stack case 20 can receive the collision load at the time of front collision of the vehicle before the collision load is applied to the mount 38. Accordingly, it is possible to protect the fuel cell control unit 46 effectively at the time of front collision of the vehicle.

The fuel cell vehicle 10 includes the cable 48 electrically connected to the fuel cell control unit 46, and the ion exchanger 34 provided on the front surface 20f of the stack case 20, and configured to remove impurities from the coolant water for the fuel cell stack 18. The portion of the cable 48 at the forefront position in the vehicle (cable forefront portion, the second extension portion 56c) is positioned on the vehicle rear side as compared with the front end of the ion exchanger 34.

In the structure, the ion exchanger 34 can receive the collision load at the time of front collision of the vehicle before the collision load is applied to the cable 48. Accordingly, with the simple and economical structure, it is possible to protect the fuel cell control unit 46 (electric member 50) at the time of front collision of the vehicle. Further, the ion exchanger 34 can receive the collision load at the time of front collision of the vehicle before the collision load is applied to the stack case 20. Accordingly, it is possible to protect the interruption control unit 42, the voltage control unit 40, and the fuel cell control unit 46 more effectively, at the time of front collision of the vehicle.

The portion of the cable 48 at the forefront position in the vehicle (cable forefront portion, the second extension portion 56c) is positioned on the vehicle rear side as compared with the center of the ion exchanger 34 in the vehicle front/rear direction.

In the structure, even if the ion exchanger 34 is collapsed toward the vehicle rear side due to the collision load at the time of front collision of the vehicle, it is possible to suppress application of the collision load to the cable 48.

The fuel cell vehicle 10 includes the temperature regulator valve 36 configured to regulate the temperature of the coolant water for the fuel cell stack 18, and the temperature regulator valve 36 is arranged on the front surface 20f of the stack case 20.

In the structure, the temperature regulator valve 36 can receive the collision load at the time of front collision of the vehicle before the collision load is applied to the stack case 20. Accordingly, with simple and economical structure, it is possible to protect the electric member 50 at the time of front collision of the vehicle more effectively.

The fuel cell vehicle of the present invention is not limited to the above described embodiment. It is a matter of course that various structures can be adopted without departing from the gist of the present invention.

What is claimed is:

1. A fuel cell vehicle comprising:
   a fuel cell stack;
   a stack case containing the fuel cell stack;
   an interruption control unit configured to electrically interrupt an output line of the fuel cell stack at a time of vehicle collision;
   a fuel cell control unit configured to control the fuel cell stack;
   a cable electrically connected to the fuel cell control unit; and
   an ion exchanger provided on a front surface of the stack case, and configured to remove impurities from coolant water for the fuel cell stack,
   wherein the interruption control unit is arranged on an upper surface of the stack case,
   wherein a front end of the interruption control unit is positioned on a vehicle rear side as compared with a front end of the stack case, and
   wherein a portion of the cable at a forefront position in the vehicle is positioned on the vehicle rear side as compared with a front end of the ion exchanger.

2. The fuel cell vehicle according to claim 1, further comprising a voltage control unit electrically connected to the interruption control unit, and configured to control output voltage of the fuel cell stack, wherein the voltage control unit is arranged on the vehicle rear side of the stack case.

3. The fuel cell vehicle according to claim 1, further comprising a mount configured to fix the stack case, wherein the fuel cell control unit is arranged on a vehicle rear side of the mount in a manner that the fuel cell control unit is overlapped with the mount in a front view viewed from a vehicle front side.

4. The fuel cell vehicle according to claim 3, wherein the mount and the fuel cell control unit are arranged on a same side surface of the stack case in a vehicle width direction, respectively, and a front end of the mount is positioned on the vehicle rear side as compared with the front end of the stack case.

5. The fuel cell vehicle according to claim 1, wherein the portion of the cable at the forefront position in the vehicle is positioned on the vehicle rear side as compared with a center of the ion exchanger in a vehicle front/rear direction.

6. The fuel cell vehicle according to claim 1, further comprising a temperature regulator valve configured to regulate temperature of coolant water for the fuel cell stack, wherein the temperature regulator valve is arranged on a front surface of the stack case.

7. The fuel cell vehicle according to claim 1, further comprising:
   a temperature regulator valve configured to regulate temperature of the coolant water for the fuel cell stack, wherein the temperature regulator valve is arranged on a front surface of the stack case in a manner that the temperature regulator valve and the ion exchanger are juxtaposed in a vehicle width direction.

8. The fuel cell vehicle according to claim 7, wherein a front end of the temperature regulator valve is positioned on a rear side as compared with a front end of the ion exchanger.

9. The fuel cell vehicle according to claim 8, wherein the ion exchanger is configured to be collapsible in a vehicle front/rear direction.

10. A fuel cell vehicle comprising:
    a fuel cell stack;
    a stack case containing the fuel cell stack;
    an interruption control unit configured to electrically interrupt an output line of the fuel cell stack at a time of vehicle collision;
    a mount configured to fix the stack case; and
    a fuel cell control unit configured to control the fuel cell stack,
    wherein the interruption control unit is arranged on an upper surface of the stack case,
    wherein a front end of the interruption control unit is positioned on a vehicle rear side as compared with a front end of the stack case, and
    wherein the fuel cell control unit is arranged on a vehicle rear side of the mount in a manner that the fuel cell control unit is overlapped with the mount in a front view viewed from a vehicle front side.

* * * * *